United States Patent [19]
Liu et al.

[11] Patent Number: 5,706,449
[45] Date of Patent: Jan. 6, 1998

[54] METHOD AND SYSTEM FOR PROVIDING IMPROVED SPECIFICATION OF MULTIPLE SORT CRITERIA IN A GRAPHICAL USER INTERFACE

[75] Inventors: Zhiqiang Liu, Atlanta; Vijay Vasandani, Roswell, both of Ga.

[73] Assignee: International Business Machines Corporation, Armonk, N.Y.

[21] Appl. No.: 529,944

[22] Filed: Sep. 18, 1995

[51] Int. Cl.$^6$ ........................................... G06F 17/30
[52] U.S. Cl. ..................... 395/326; 395/352; 395/353; 395/607
[58] Field of Search ........................... 395/326, 333, 395/339, 347, 752, 354, 607, 604

[56] References Cited

U.S. PATENT DOCUMENTS

| | | | |
|---|---|---|---|
| 5,432,903 | 7/1995 | Frid-Nielsen | 395/161 |
| 5,563,997 | 10/1996 | Fisher | 395/148 |

OTHER PUBLICATIONS

Turbo C++ v3.0 Borland International Inc., screen pp.1–14, 1992.

*Primary Examiner*—Thomas G. Black
*Assistant Examiner*—Donald Min
*Attorney, Agent, or Firm*—Norman L. Gundel

[57] ABSTRACT

The present invention provides a method and system for providing improved controls in a graphical user interface. One feature of the present invention provides a control that enables a user to assign multiple values to the control. This multi-value field control includes an extension to known controls that allows the user to enter more than one value into the control. After a value has been entered into the multi-value field control, the user can modify or delete the value. Another feature of the present invention provides a control that enables a user to efficiently specify multiple sort criteria for the control. This sort order control lists all of the possible sort criteria together with a selection indicator next to each sort criteria. When the user selects a sort criteria, the sort order control indicates the selection of the sort criteria in the selection indicator and places a numeric character representing the order in which the sort criteria was selected next to the sort criteria. Another feature of the present invention provides a control that enables a user to manipulate lists in the control. The list operations that can be performed using the list control include: (1) swapping columns, (2) freezing and unfreezing columns, (3) hiding and showing columns, and (4) finding text in columns.

12 Claims, 19 Drawing Sheets

METHOD AND SYSTEM FOR PROVIDING IMPROVED SPECIFICATION OF MULTIPLE SORT CRITERIA IN A GRAPHICAL USER INTERFACE

FIELD OF THE INVENTION

The present invention relates generally to graphical user interfaces in computer systems and, more particularly, to a method and system for providing improved controls in a graphical user interface.

BACKGROUND OF THE INVENTION

User interfaces are components of computer systems that enable users of the computer system to communicate with the computer system. Graphical user interfaces are a type of user interfaces that display graphical symbols to the user to enable the user to more easily communicate with the computer system. For example, a graphical user interface might display a symbol representing a printer that a user can select to print a document. In a non-graphical user interface, the user might instead have to remember the command for printing and enter the command at a command line. Thus, the graphical user interface simplifies communication with the computer system for users. Graphical user interface controls are components of graphical user interfaces that enable users to select or enter information into the computer system.

Some known graphical user interface controls are entry fields, drop-down lists, and drop-down combination boxes. An entry field is an area on a computer screen where the user types information. A drop-down list is a selection field together with a list where only a current choice is visible in the selection field on the computer screen and other choices are hidden in the list until the user explicitly acts to display the other choices. With the drop-down list, the user can only select a single choice in the selection field. A drop-down combination box is an entry field together with a list where only a current choice is visible in the entry field on the computer screen and other choices are hidden until the user explicitly acts to display the other choices. With the drop-down combination box, the user can only select or enter a single choice in the entry field. The primary distinction between a drop-down list and a drop-down combination box is that the user can only select a choice with the drop-down list, whereas the user can either select a choice or type a choice with the drop-down combination box.

The common element, and problem, with all of these known graphical user interface controls is that the user can only use the controls to enter a single choice. So, for example, if the user is utilizing one of these known controls to select a number of folders and the user would like to select all the folders that were originated by both A and B, the user would have to interact with the control twice—during the first interaction, the user could select all the folders originated by A and, during the second interaction, the user could select all the folders originated by B. Ideally, the user would like to interact with the control only once in order to select all the folders originated by both A and B. Since the known controls only allow a user to select or enter one choice, it would not be possible to select all the folders originated by both A and B in one interaction with the control.

A known control that does allow a user to select or enter more than one choice is check boxes. Check boxes are boxes on the computer screen together with a selection choice next to each box. With check boxes, the user selects the box next to each choice that the user would like to select. Thus, check boxes allow a user to select more than one choice. However, the control must display all of the possible choice in order for the user to select the desired choices. The problem with check boxes, as a result, is that if there are more than a few possible choices, the control will fill the entire computer screen (or possibly more than one computer screen). Thus, a need still exists for a graphical user interface control that efficiently enables a user to assign multiple values to the control.

Other known graphical user interface controls are controls for specifying sort criteria. These controls enable users to enter criteria for sorting information. If the user is only permitted to enter a single sort criteria, many known controls are available for entering the criteria. However, if the user is permitted to enter multiple sort criteria and the order in which the criteria are entered is important, the known controls are not adequate.

One option for entering the sort criteria is check boxes. However, the check boxes must display all of the possible combinations of sort criteria in order for the user to select the desired combination. The problem with check boxes, as above, is that if there are more than a few possible combinations of sort criteria, the control will fill the entire computer screen (or possibly more than one computer screen). For example, even if there were only two sort criteria (A and B), there would be four possible combinations of sort criteria (A; B; A within B; and B within A). Typically, there will be a large number of sort criteria. Thus, the resulting number of possible combinations of the sort criteria becomes unmanageable and makes check boxes a poor choice for entering the sort criteria.

Another option would be to display a list of all possible sort criteria and then have the user select the desired sort criteria in the order in which the user would like to have the sort performed. Then, as the user selected the sort criteria, the control would display the selected criteria in a second list in the order in which they were selected. The problem with this option is that if the user decides to change the sort criteria, or the order in which the sort is performed, the entire second list must be recreated. Thus, a need still exists for a graphical user interface control that efficiently enables a user to specify multiple sort criteria for the control.

Other known graphical user interface controls are list controls. List controls enable users to manipulate lists of information. Known list controls do not provide users with a comprehensive ability to manipulate lists. Moreover, known list controls only allow users to manipulate lists of the same type of objects (homogeneous objects). An object is a data structure that includes attributes. The attributes define the characteristics of the object. Known list controls do not allow users to display different types of objects (heterogeneous objects). Thus, a need still exists for a graphical user interface control that allows a user to comprehensively manipulate lists of heterogeneous objects in the control.

SUMMARY OF THE INVENTION

The present invention provides a method and system for providing improved controls in a graphical user interface. One feature of the present invention provides a control that enables a user to assign multiple values to the control. This multi-value field control includes an extension, such as a scrollable list, to known controls that allows the user to enter more than one value into the control. As the user enters values into the multi-value field control, the entered values are moved into the scrollable list. After a value has been entered into the multi-value field control, the user can modify or delete the value.

Another feature of the present invention provides a control that enables a user to efficiently specify multiple sort criteria for the control. This sort order control lists all of the possible sort criteria together with a selection indicator next to each sort criteria. When the user selects a sort criteria, the sort order control indicates the selection of the sort criteria in the selection indicator and places a numeric character representing the order in which the sort criteria was selected next to the sort criteria. The sort order control maintains information regarding the order in which the sort criteria are selected. As each new sort criteria is selected, the sort order control places the next higher numeric character next to the sort criteria. When the user de-selects a sort criteria, the sort order control indicates the de-selection of the sort criteria in the selection indicator and removes the numeric character next to the sort criteria. Additionally, when the user de-selects a sort criteria, the sort order control adjusts the numeric character(s) next to the remaining selected sort criteria, if necessary.

Another feature of the present invention provides a control that enables a user to manipulate lists in the control, in particular, lists containing heterogenous objects. The list operations that can be performed using the list control include: (1) swapping columns, (2) freezing and unfreezing columns, (3) hiding and showing columns, and (4) finding text in columns. The swap operation enables the user to swap columns in the list control. The freeze and unfreeze operations enable the user to freeze and unfreeze the position of a column in the list control. The hide and show operations enable the user to make a column invisible and visible in the list control. The find operation enables the user to find text in a column in the list control.

DETAILED DESCRIPTION OF THE PREFERRED EMBODIMENT

Figure 1:
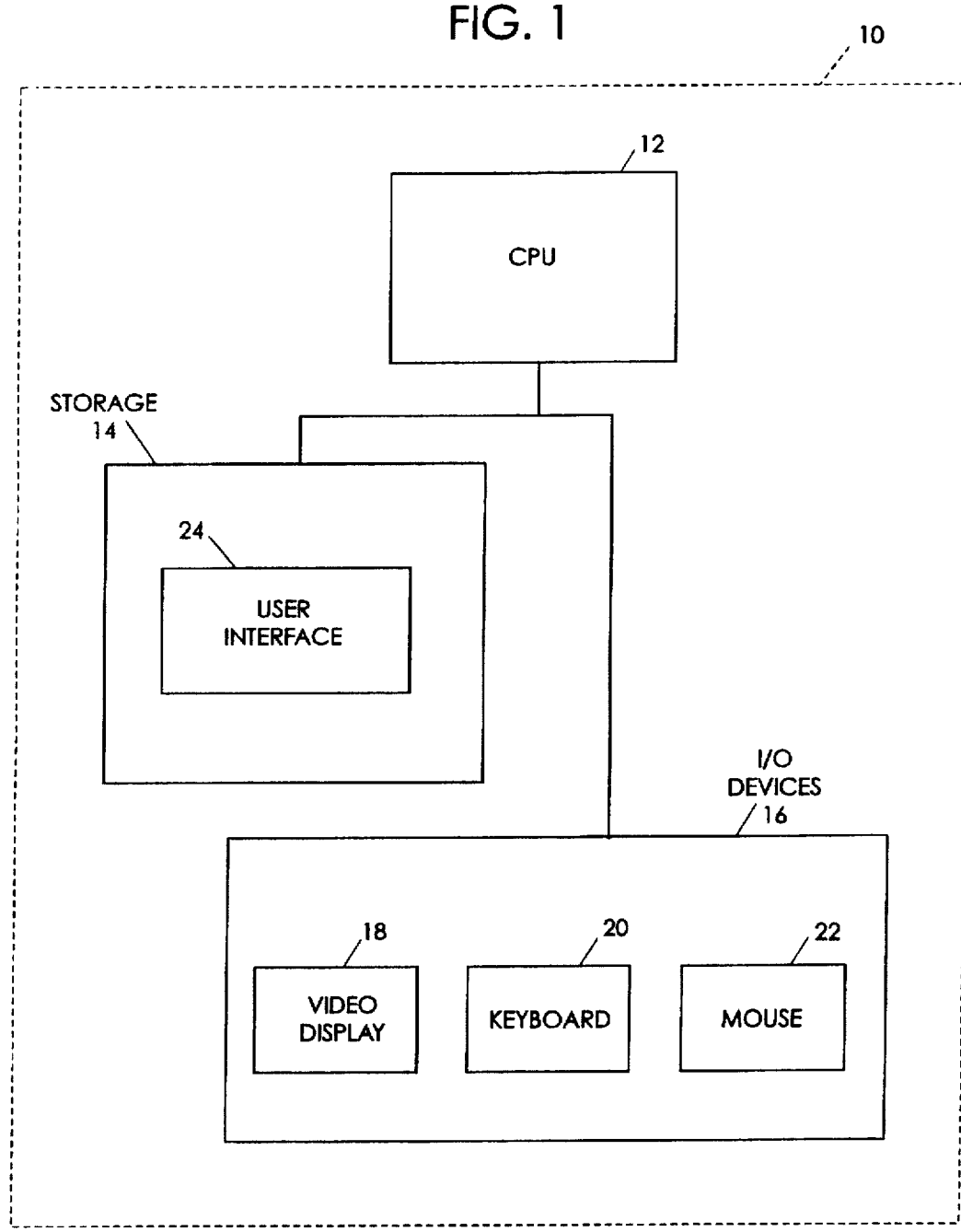
FIG. 1 is a block diagram illustrating a computer system in which the preferred embodiment of the present invention operates.

The preferred embodiment of the present invention provides a method and system for providing improved controls in a graphical user interface. A computer system 10 in which the preferred embodiment of the present invention operates is illustrated in FIG. 1. The computer system 10 includes a central processing unit ("CPU") 12, storage 14, and input/output ("I/O") devices 16. Typical I/O devices include a video display 18, a keyboard 20, and a mouse 22. A graphical user interface 24 is stored in the storage 14 for execution by the CPU 12. The graphical user interface 24 enables the user of the computer system 10 to communicate with the computer system.

Multi-Value Field Control

Figure 2:
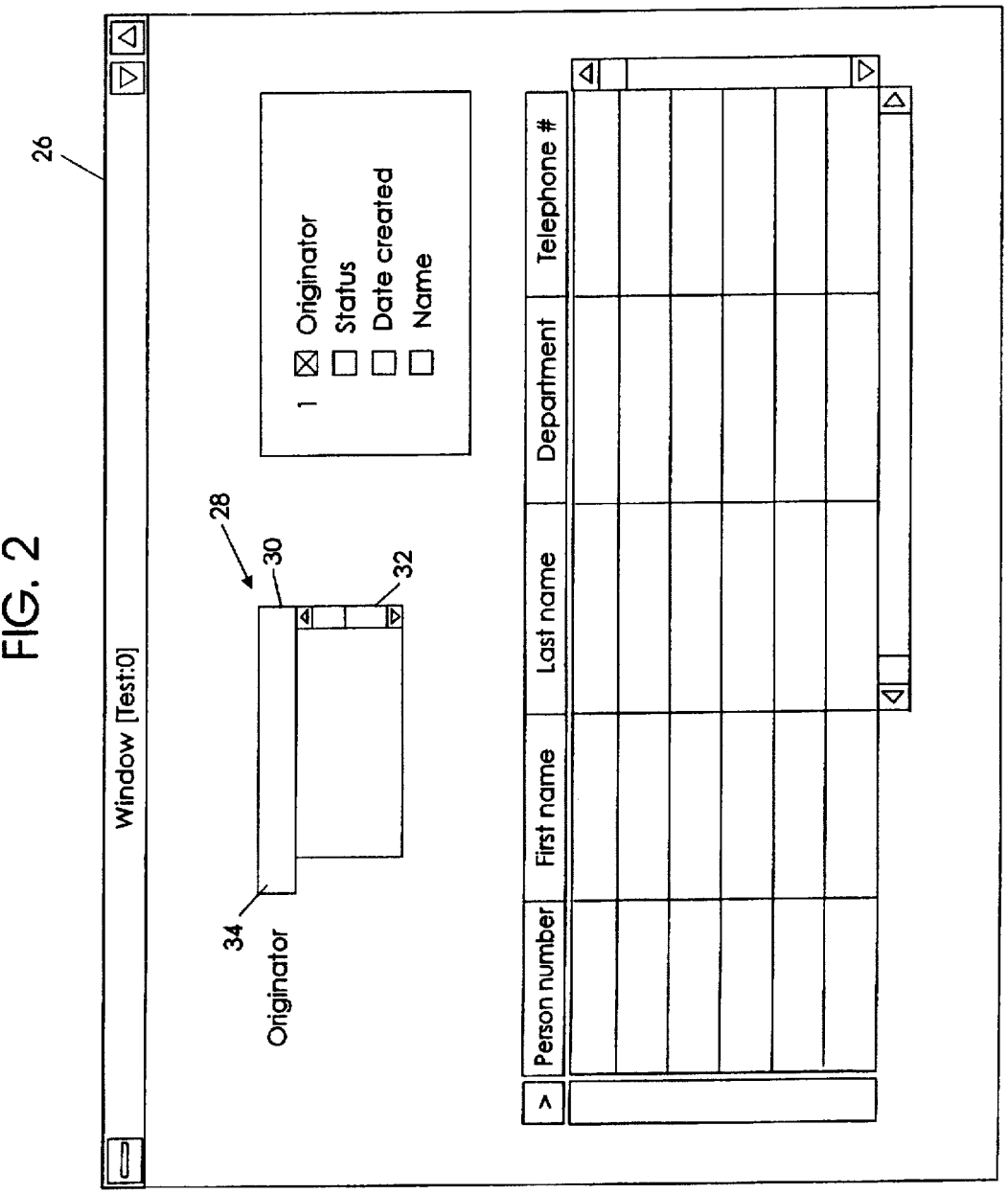
FIG. 2 is a window that may be displayed on a video display in the computer system of FIG. 1 when a user utilizes a multi-value field control of the present invention.

One feature of the present invention provides a control that enables a user to assign multiple values to the control. FIG. 2 shows an exemplary window 26 that may be displayed on the video display 18 when the user utilizes this multi-value field control to select folders based upon the originators of the folders. The window 26 includes multi-value field control 28. The multi-value field control of the present invention may include any of several known controls, such as an entry field, a drop-down list, or a drop-down combination box. These known controls were discussed above and will not be discussed in greater detail here. As shown in FIG. 2, the multi-value field control 28 includes an entry field 30. The multi-value field control of the present invention further includes an extension to one of these known controls that allows the user to enter more than one value into the control. As shown in FIG. 2, the multi-value field control 28 further includes a scrollable list 32 that is attached to the entry field 30. In a preferred embodiment of the present invention, the scrollable list 32 is attached to a bottom edge 34 of the entry field 30. Utilizing this multi-value field control, the user can select folders based upon a multiple number of originators of the folders.

Figure 3:
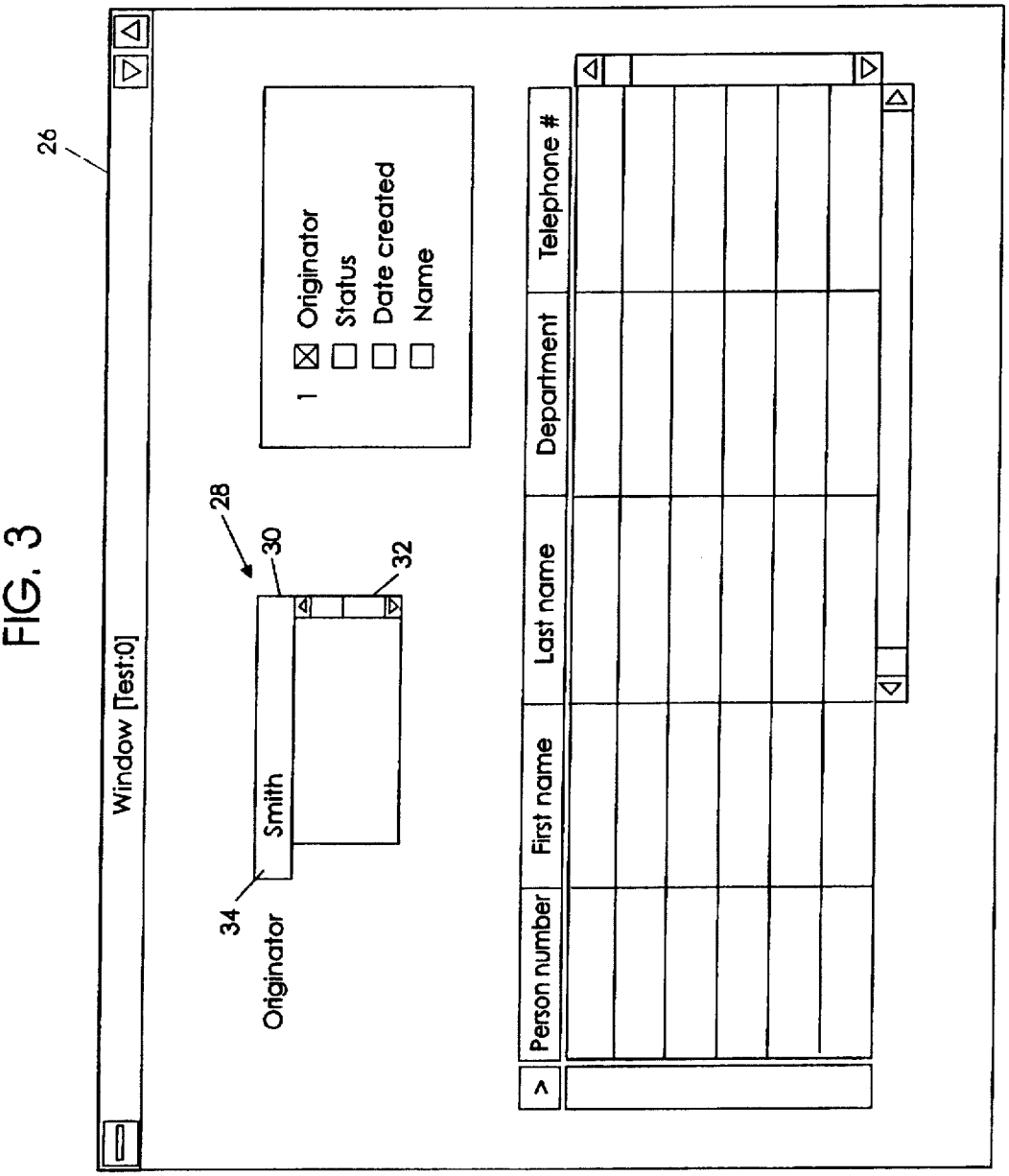
FIG. 3 is the window of FIG. 2 during entry of a first value into the multi-value field control.
Figure 4:
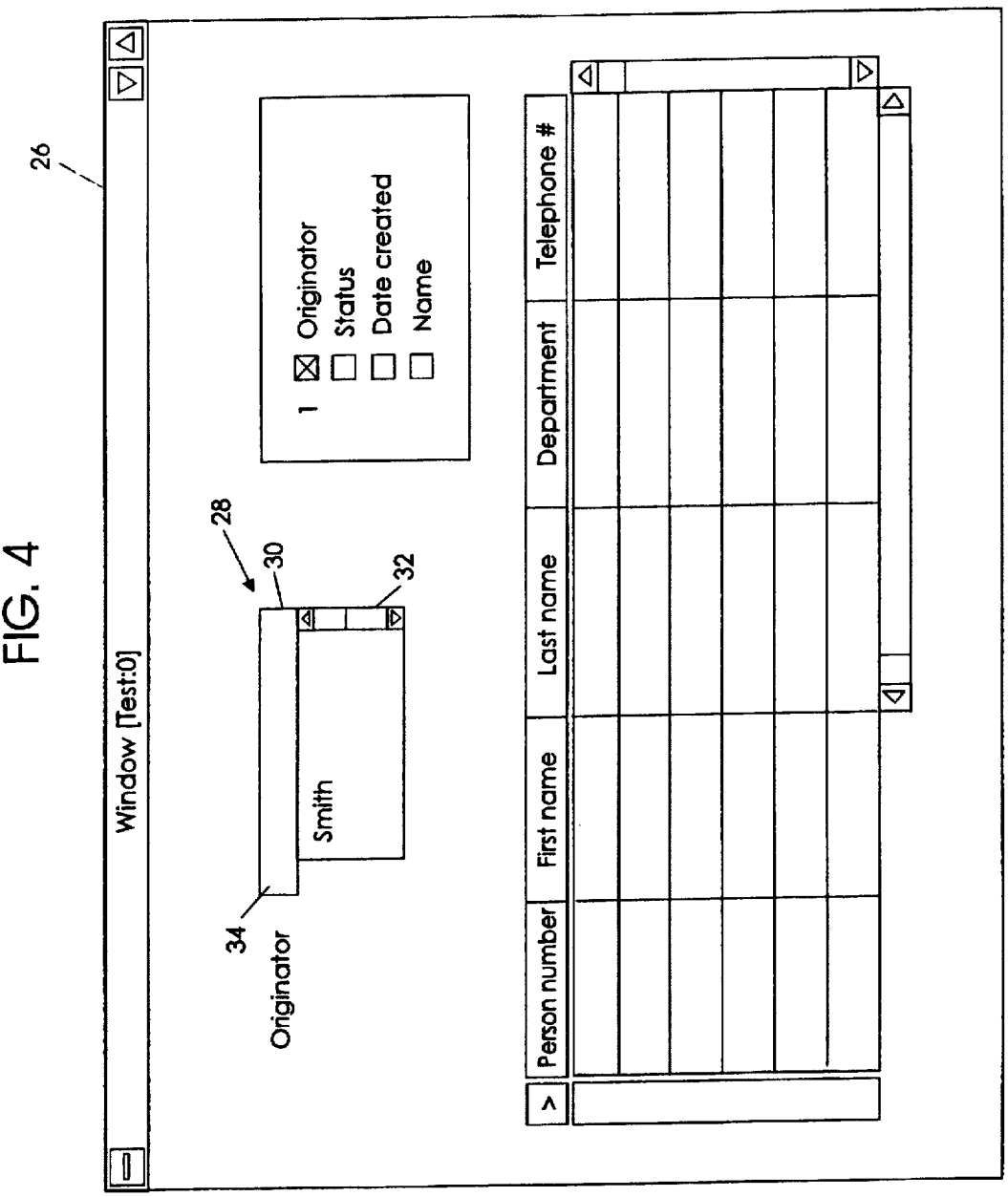
FIG. 4 is the window of FIG. 3 after entry of the first value into the multi-value field control.

In order to enter a value into the multi-value field control 28, the user types the value in the entry field 30 and then presses an ENTER key on the user's keyboard 20. After the user enters a value, the multi-value field control 28 moves the entered value into the scrollable list 32. FIG. 3 shows the window 26 during the entry of a first value ("Smith") in the entry field 30 and FIG. 4 shows the window 26 after the first value has been moved into the scrollable list 32.

Figure 5:
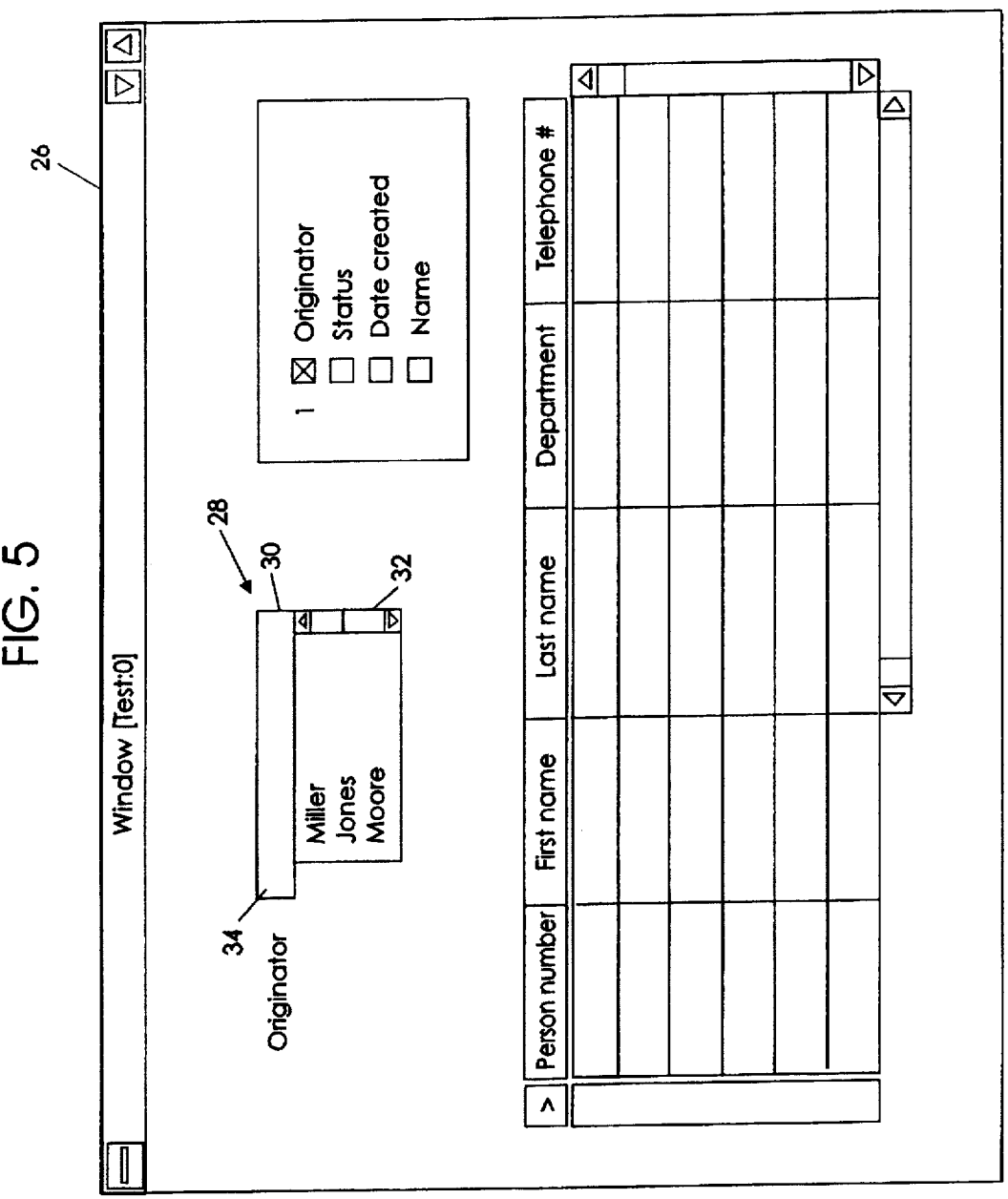
FIG. 5 is the window of FIG. 4 after entry of four values into the multi-value field control.

After the user has entered a value into the multi-value field control 28, the user can continue to enter additional values. As each additional value is entered, the multi-value field control 28 moves the entered value into the scrollable list 32. FIG. 5 shows the window 26 after four values ("Smith", "Miller", "Jones", and "Moore") have been entered into the entry field 30 and moved into the scrollable list 32.

Figure 6:
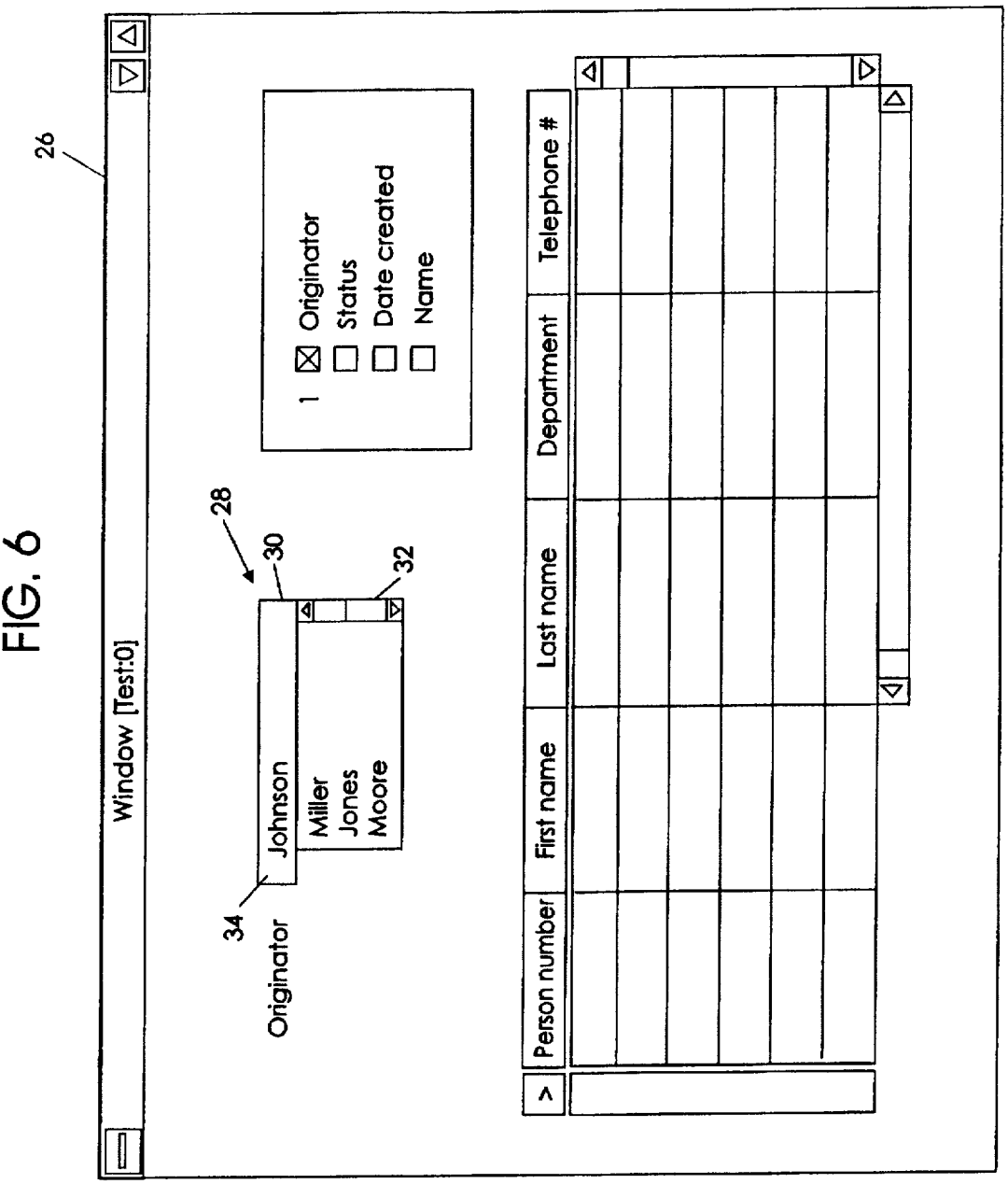
FIG. 6 is the window of FIG. 5 during modification of the third entered value in the multi-value field control.
Figure 7:
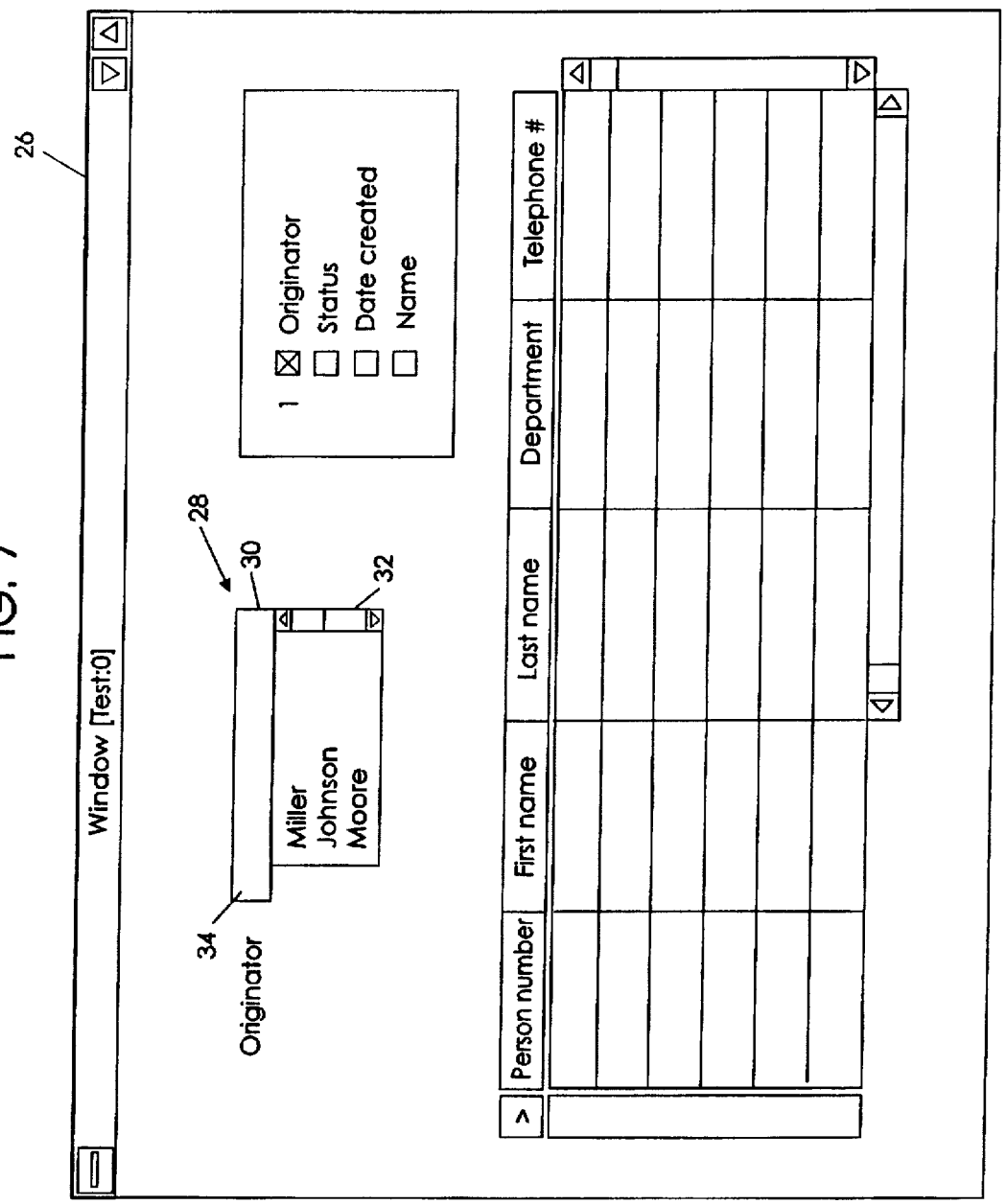
FIG. 7 is the window of FIG. 6 after modification of the third entered value in the multi-value field control.

If the user desires to modify a value that has been entered into the multi-value field control 28, the user can select the value to be modified by moving a cursor on top of the desired value in the scrollable list 32 and pressing the ENTER key or an appropriate button on the user's mouse 22 (known as clicking the mouse button). The multi-value field control 28 then moves the selected value back into the entry field 30 so that the user can modify the value. After the user has modified the value, the user presses the ENTER key and the multi-value field control 28 moves the modified value back into the scrollable list 32 in place of the old value. FIG. 6 shows the window 26 during modification of the third entered value ("Jones") and FIG. 7 shows the window 26 after modification of the third entered value (to "Johnson").

Figure 8:
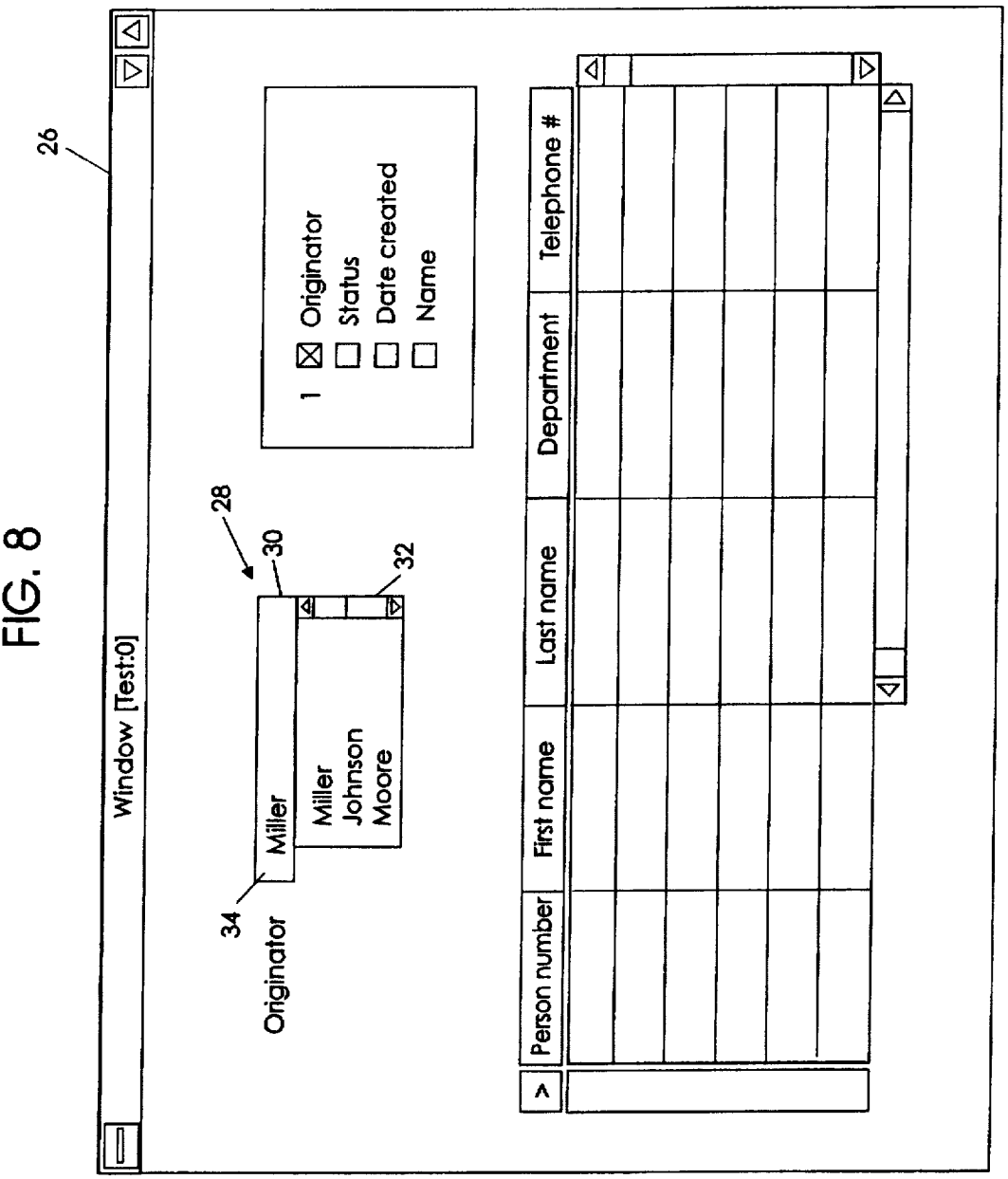
FIG. 8 is the window of FIG. 7 after selection of the second entered value for deletion in the multi-value field control.
Figure 9:
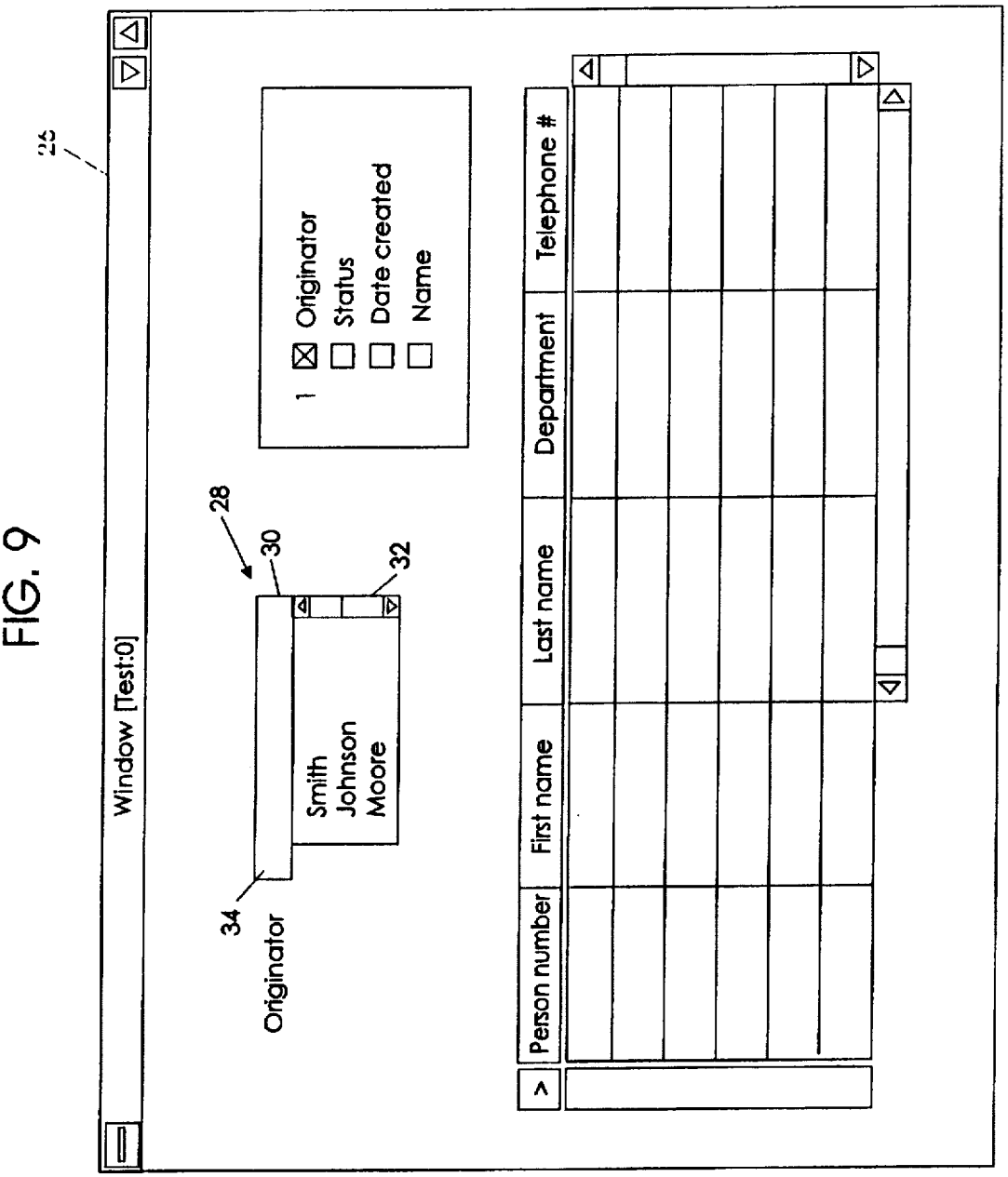
FIG. 9 is the window of FIG. 8 after deletion of the second entered value in the multi-value field control.

Additionally, if the user desires to delete a value that has been entered into the multi-value field control 28, the user can select the value to be deleted by moving the cursor on top of the desired value in the scrollable list 32 and pressing a DELETE key on the user's keyboard 20. The multi-value field control 28 then removes the selected value from the scrollable list 32. FIG. 8 shows the window 26 after selection of the second entered value ("Miller") for deletion and FIG. 9 shows the window 26 after deletion of the second entered value.

Further, if the user has selected a value that has been entered into the multi-value field control 28 for either modification or deletion and then decides not to modify or delete the value, the user can de-select the modification or deletion by pressing an ESCAPE key on the user's keyboard 20.

Sort Order Control

Figure 10:
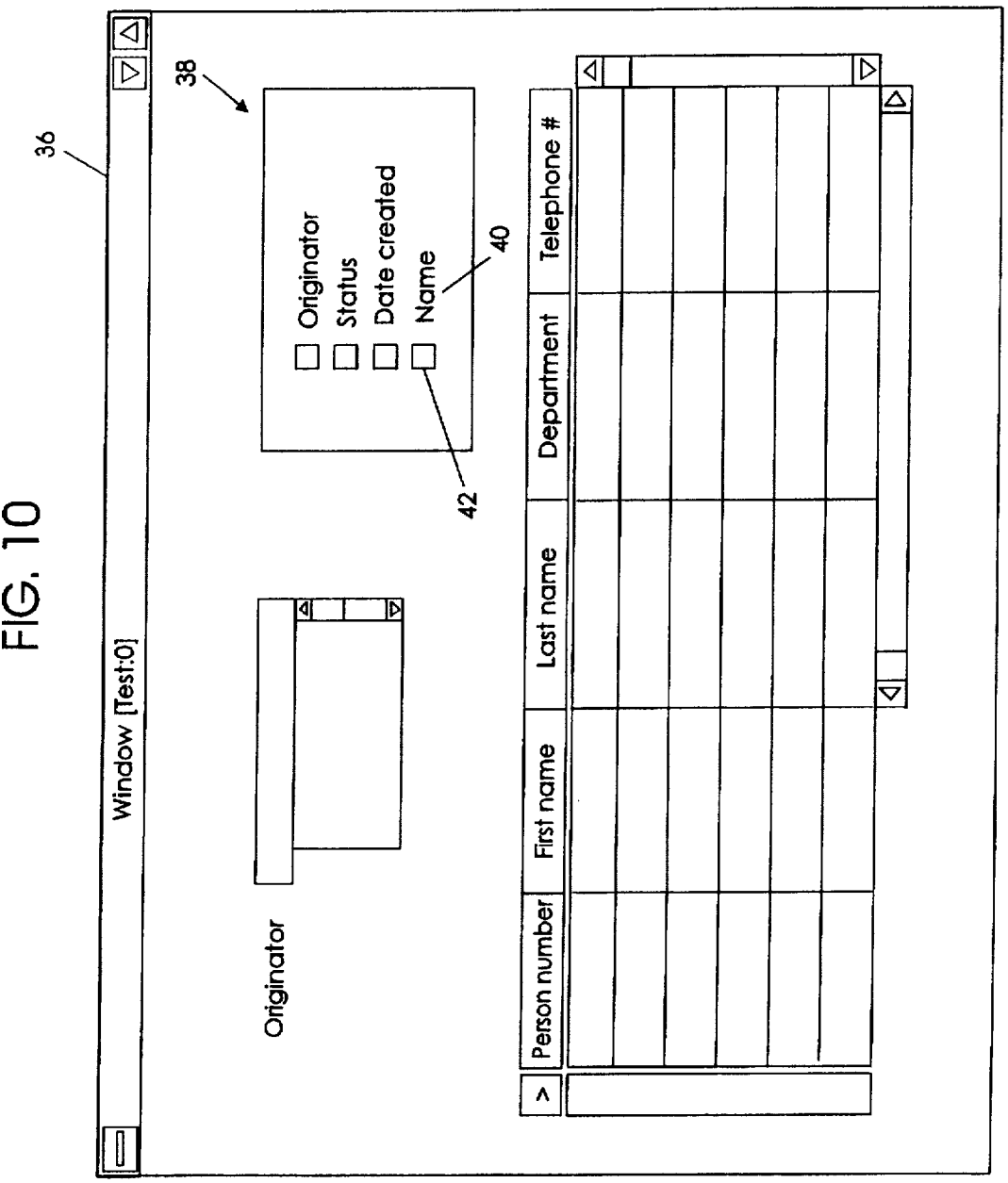
FIG. 10 is a window that may be displayed on a video display in the computer system of FIG. 1 when a user utilizes a sort order control of the present invention.

Another feature of the present invention provides a control that enables a user to efficiently specify multiple sort criteria for the control. FIG. 10 shows an exemplary window 36 that may be displayed on the video display 18 when the user utilizes this sort order control to sort folders. The window 36 includes sort order control 38. The sort order control 38 lists all of the possible sort criteria 40 together with a selection indicator, such as a check box 42, next to each sort criteria. As shown in FIG. 10, the sort criteria 40 include (a) originator, (b) status, (c) date created, and (d) name. Utilizing this sort order control, the user can sort folders based upon any combination of the sort criteria.

Figure 11:
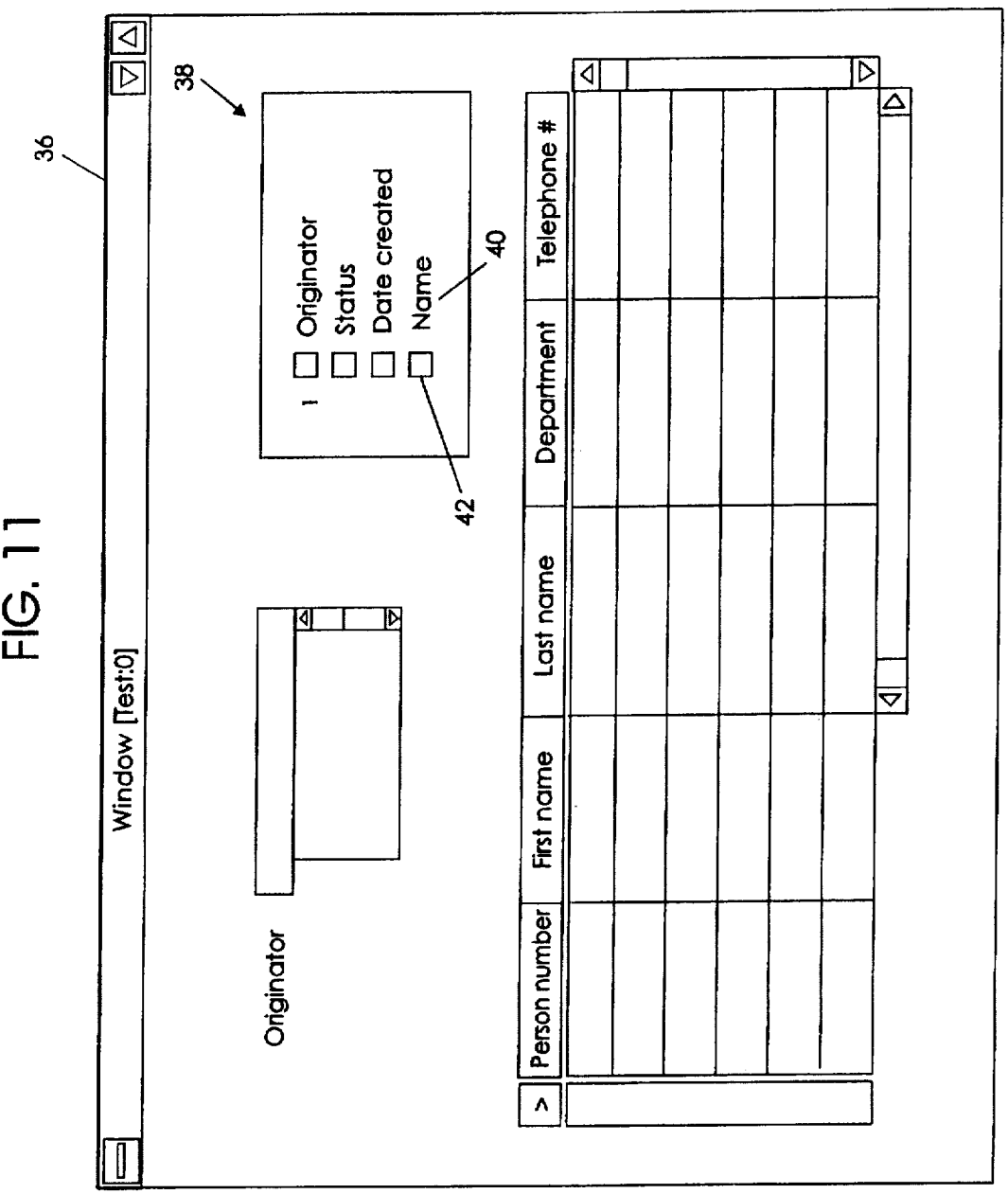
FIG. 11 is the window of FIG. 10 after selection of a first sort criteria in the sort order control.

In order to select a sort criteria 40, the user moves the cursor on top of the desired sort criteria in the sort order control 38 and presses the ENTER key or clicks the mouse button. After the user selects a particular sort criteria 40, the sort order control 38: (1) indicates the selection of the sort criteria in the selection indicator, e.g., by placing an "X" in the check box 42 next to the sort criteria, and (2) places a numeric character representing the order in which the sort criteria was selected next to the sort criteria. FIG. 11 shows the window 36 after the selection of a first sort criteria ("Originator").

Figure 12:
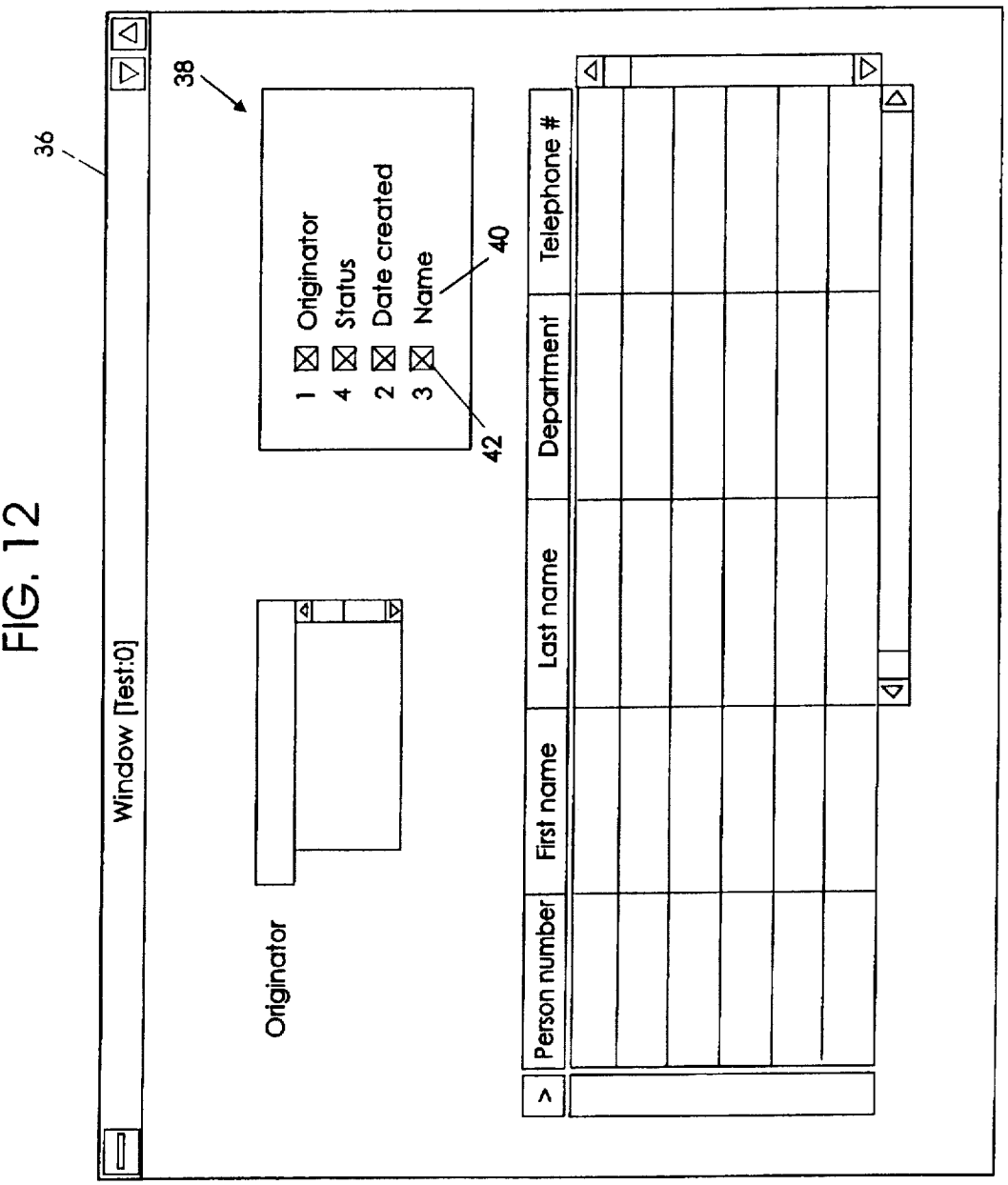
FIG. 12 is the window of FIG. 11 after selection of four sort criteria in the sort order control.

The sort order control 38 maintains information regarding the order in which the sort criteria 40 are selected. As each new sort criteria 40 is selected, the sort order control 38 places the next higher numeric character next to the sort criteria. FIG. 12 shows the window 36 after the selection of four sort criteria ("Originator", "Date created", "Name", and "Status").

Figure 13:
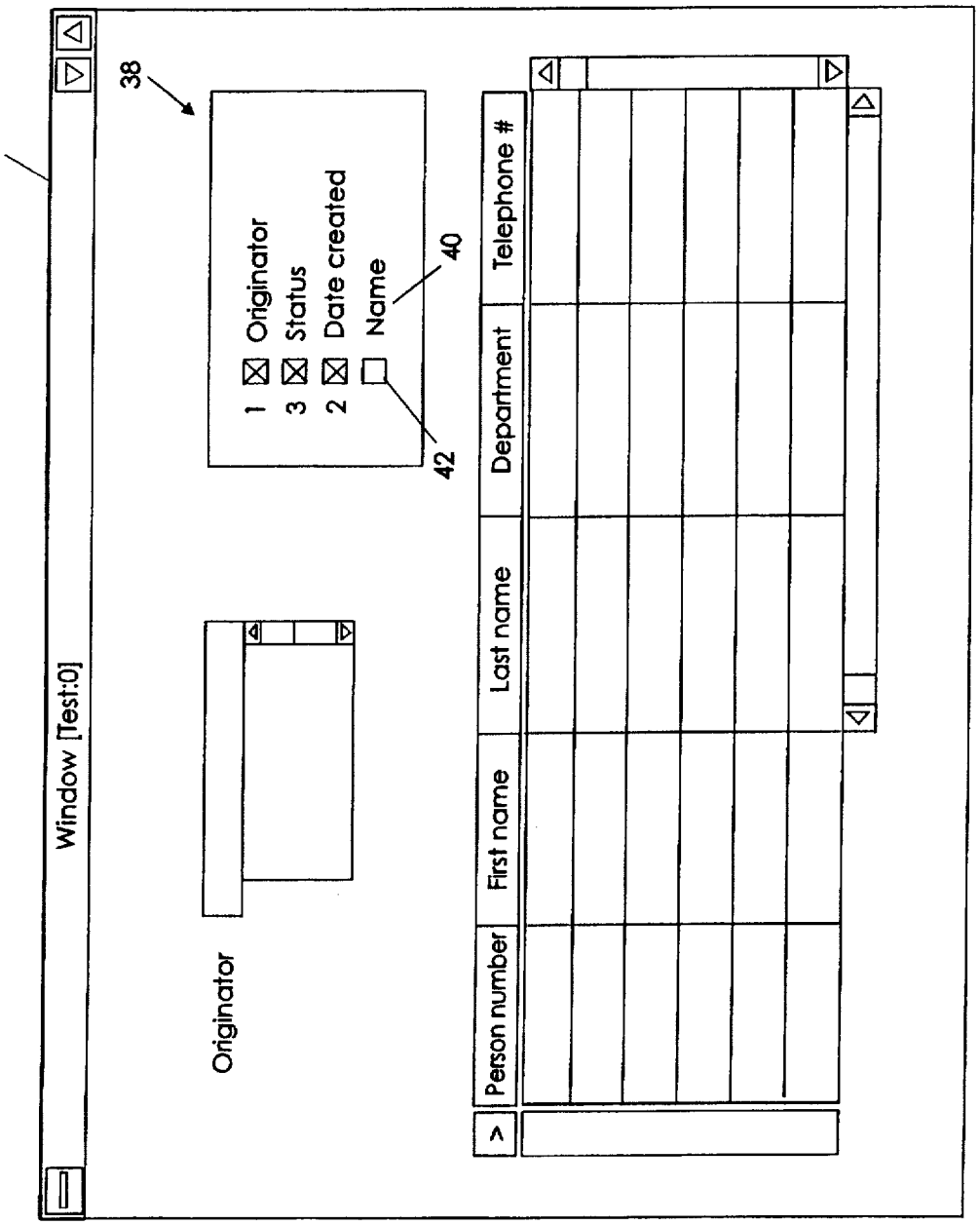
FIG. 13 is the window of FIG. 12 after de-selection of the third selected sort criteria in the sort order control.

In addition to selecting sort criteria 40, the user can de-select sort criteria. The user can de-select a sort criteria 40 by moving the cursor on top of the desired sort criteria in the sort order control 38 and pressing the ENTER key or clicking the mouse button. After the user de-selects a particular sort criteria 40, the sort order control 38: (1) indicates the de-selection of the sort criteria in the selection indicator, e.g., by removing the "X" in the check box 42 next to the sort criteria, and (2) removes the numeric character next to the sort criteria. Additionally, after the user de-selects a particular sort criteria 40, the sort order control 38 adjusts the numeric character(s) next to the remaining selected sort criteria, if necessary. FIG. 13 shows the window 36 after the de-selection of the originally selected third sort criteria ("Name").

Moreover, the sort order control 38 allows the user to specify default values for the selection and order of the sort criteria 40. These default values are built into the sort order control 38 and are displayed whenever the sort order control is initially invoked.

List Control

Figure 14:
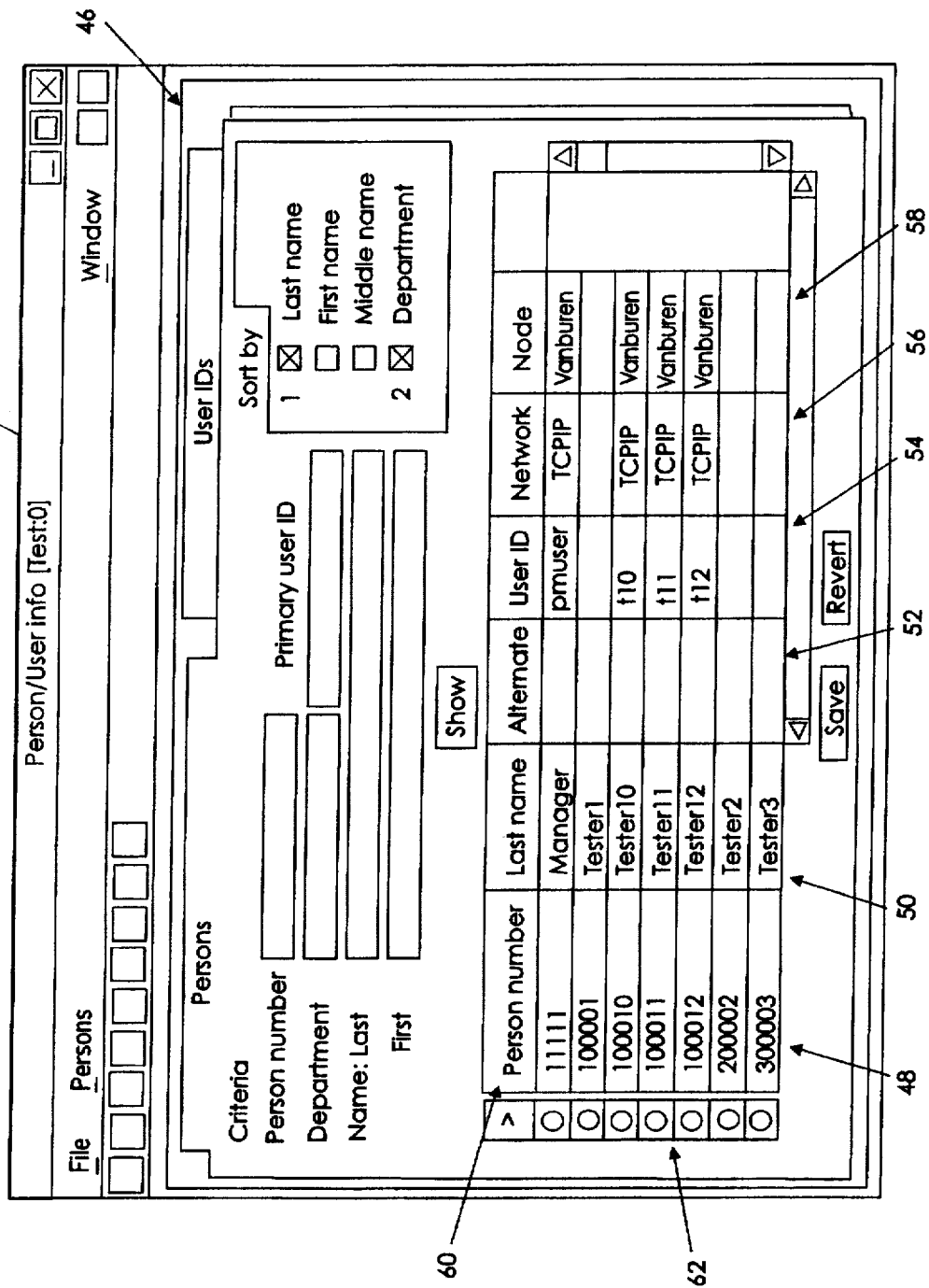
FIG. 14 is a window that may be displayed on a video display in the computer system of FIG. 1 when a user utilizes a list control of the present invention.

Another feature of the present invention provides a control that enables a user to manipulate lists in the control, in particular, lists containing heterogeneous objects. FIG. 14 shows an exemplary window 44 that may be displayed on the video display 18 when the user utilizes this list control to manipulate a list containing an object having attributes. The window 44 includes list control 46. The list control 46 includes a plurality of columns 48, 50, 52, 54, 56, and 58. Each column includes a heading and cells, such as heading 60 and cells 62 in column 48. The heading includes the name of an attribute of the object and the cells corresponding to the heading include the values of the attribute. As shown in FIG. 14, the object is a person and the attributes are Person number, Last name, Alternate, User ID, Network, and Node. Utilizing this list control, the user can manipulate the list containing the object.

Figure 15A:
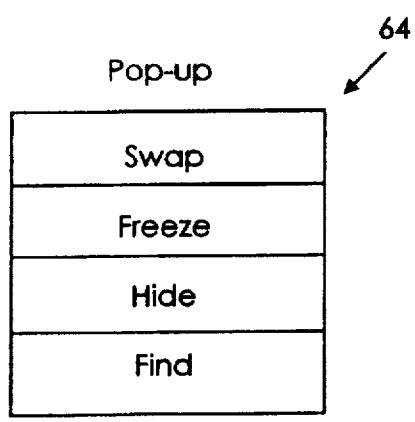
FIGS. 15A, 15B, 15C, and 15D are pop-ups that may be displayed when the user utilizes the list control of FIG. 14.
Figure 15B:
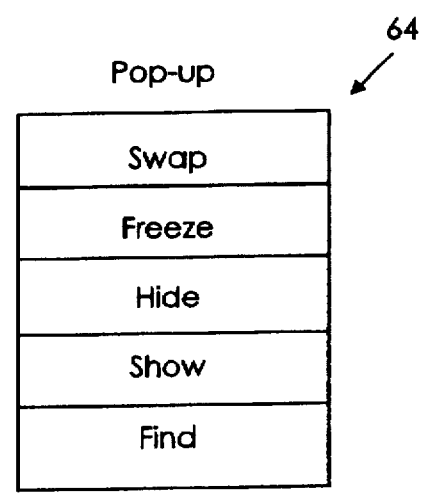
Figure 15C:
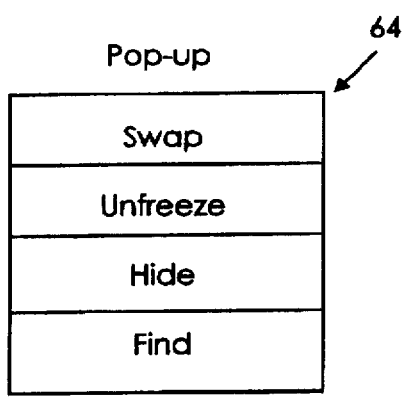
Figure 15D:
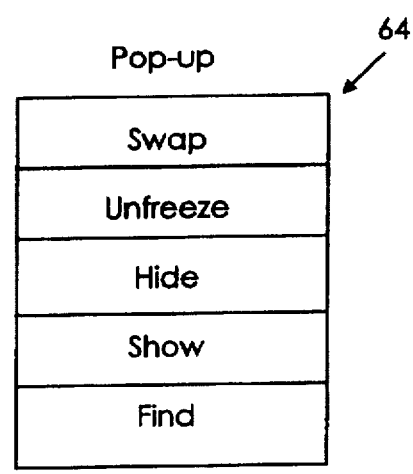

The list operations that can be performed using the list control 46 include: (1) swapping columns, (2) freezing and unfreezing columns (3) hiding and showing columns, and (4) finding text in columns. In order to perform one of these list operations, the user moves the cursor on top of one of the headings of the columns in the list control 46 and clicks the mouse button. The list control 46 then displays a pop-up 64 (see FIGS. 15A-15D) on the video display 18. FIGS. 15A, 15B, 15C, and 15D show exemplary pop-ups 64 that may be displayed. The list operations that are available to the user will depend upon: (1) the current state of the column whose heading was clicked, e.g., frozen or unfrozen and (2) the current state of all columns, e.g., hidden or shown. The pop-up 64 displays the list operations that are available in connection with the column whose heading was clicked. For example:

(1) FIG. 15A shows the pop-up 64 that is displayed if the column whose heading was clicked is unfrozen and there are no hidden columns, (2) FIG. 15B shows the pop-up 64 that is displayed if the column whose heading was clicked is unfrozen and there are hidden columns, (3) FIG. 15C shows the pop-up 64 that is displayed if the column whose heading was clicked is frozen and there are no hidden columns, and (4) FIG. 15D shows the pop-up 64 that is displayed if the column whose heading was clicked is frozen and there are hidden columns.

Figure 16:
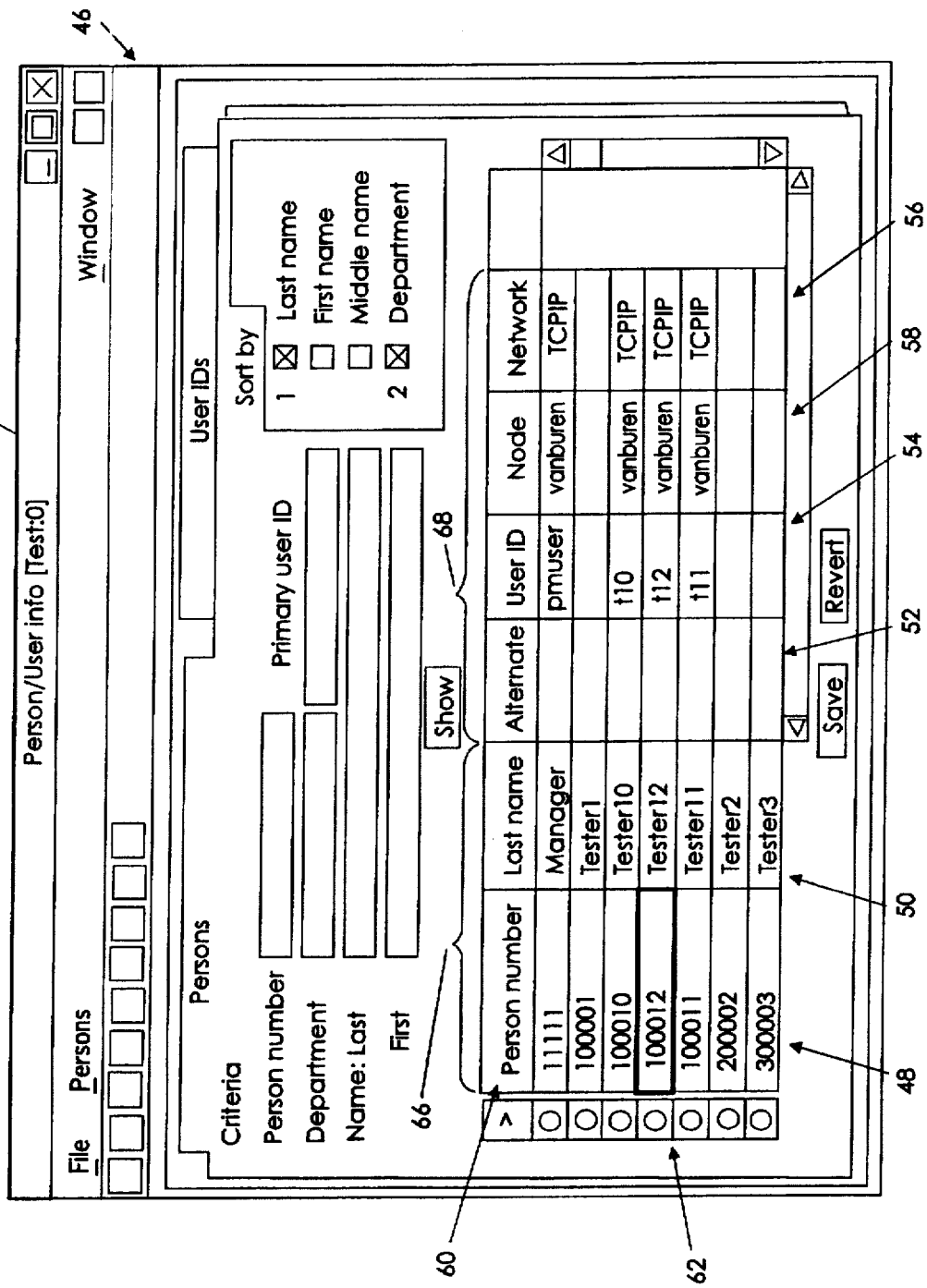
FIG. 16 is the window of FIG. 14 after two columns have been swapped.

The swap operation enables the user to swap columns in the list control 46. In order to swap columns, the user selects "Swap" in the pop-up 64. The list control 46 then displays a list of columns with which the column whose heading was clicked can be swapped. The user then selects the desired column. After receiving the user's selection, the list control 46 swaps the two columns. FIG. 16 shows the window 44 after columns 56 and 58 have been swapped.

Figure 17:
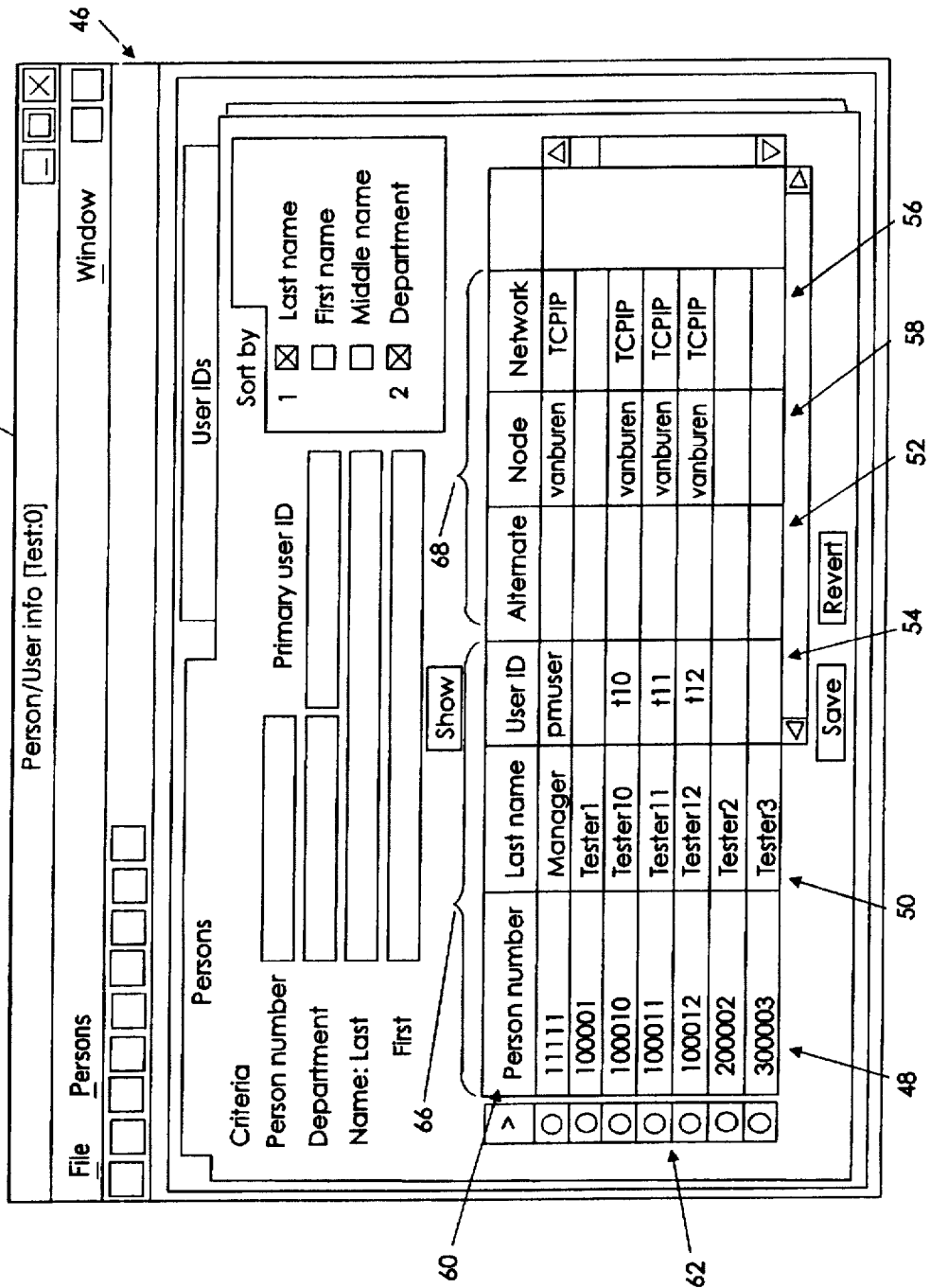
FIG. 17 is the window of FIG. 16 after a column has been frozen.
Figure 18:
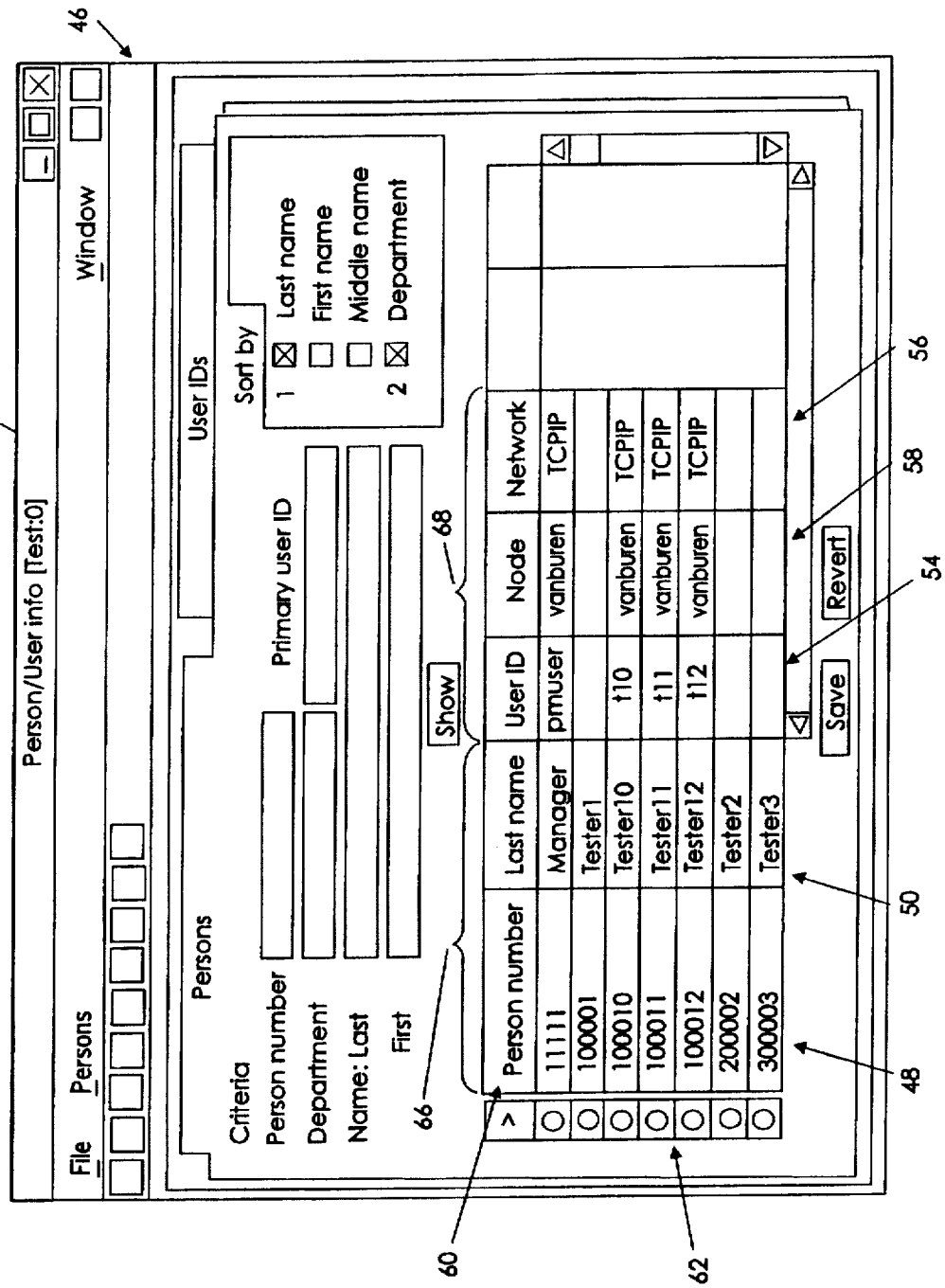
FIG. 18 is the window of FIG. 17 after a column has been hidden.

The freeze and unfreeze operations enable the user to freeze and unfreeze the position of a column in the list control 46. The list control 46 includes a frozen region 66 and an unfrozen region 68 (see FIG. 16). The frozen region 66 is on the left side of the list control 46 and the unfrozen region 68 is on the right side of the list control. The headings of the frozen columns are highlighted and the headings of the unfrozen columns are not highlighted. In order to freeze a column, the user selects "Freeze" in the pop-up 64. When a column is frozen, the list control 46 moves the column to the right-most position in the frozen region 66 of the list control and highlights the heading of the column. Then, when the user scrolls through the columns in the list control 46, the frozen column does not move. FIG. 16 shows the window 44 with columns 50 and 52 frozen. FIG. 17 shows the window 44 after column 54 has also been frozen. In order to unfreeze a column, the user selects "Unfreeze" in the pop-up 64. When a column is unfrozen, the list control 46 moves the column to the left-most position in the unfrozen region of the list control. FIG. 18 shows the window 44 after column 54 has been unfrozen.

The hide and show operations enable the user to make a column invisible and visible in the list control 46. In order to hide a column, the user selects "Hide" in the pop-up 64. When a column is hidden, the column is not visible in the list control 46. FIG. 18 shows the window 44 after column 52 has been hidden. In order to show a column, the user selects "Show" in the pop-up 64. When a column is shown, the column becomes visible in the list control 46.

The find operation enables the user to find text in a column in the list control 46. In order to find text in a column, the user selects "Find" in the pop-up 64. The list control 46 then prompts the user to enter the desired text. The user then enters the desired text. After receiving the user's input, the list control 46 searches for the desired text in the column.

Figure 19:
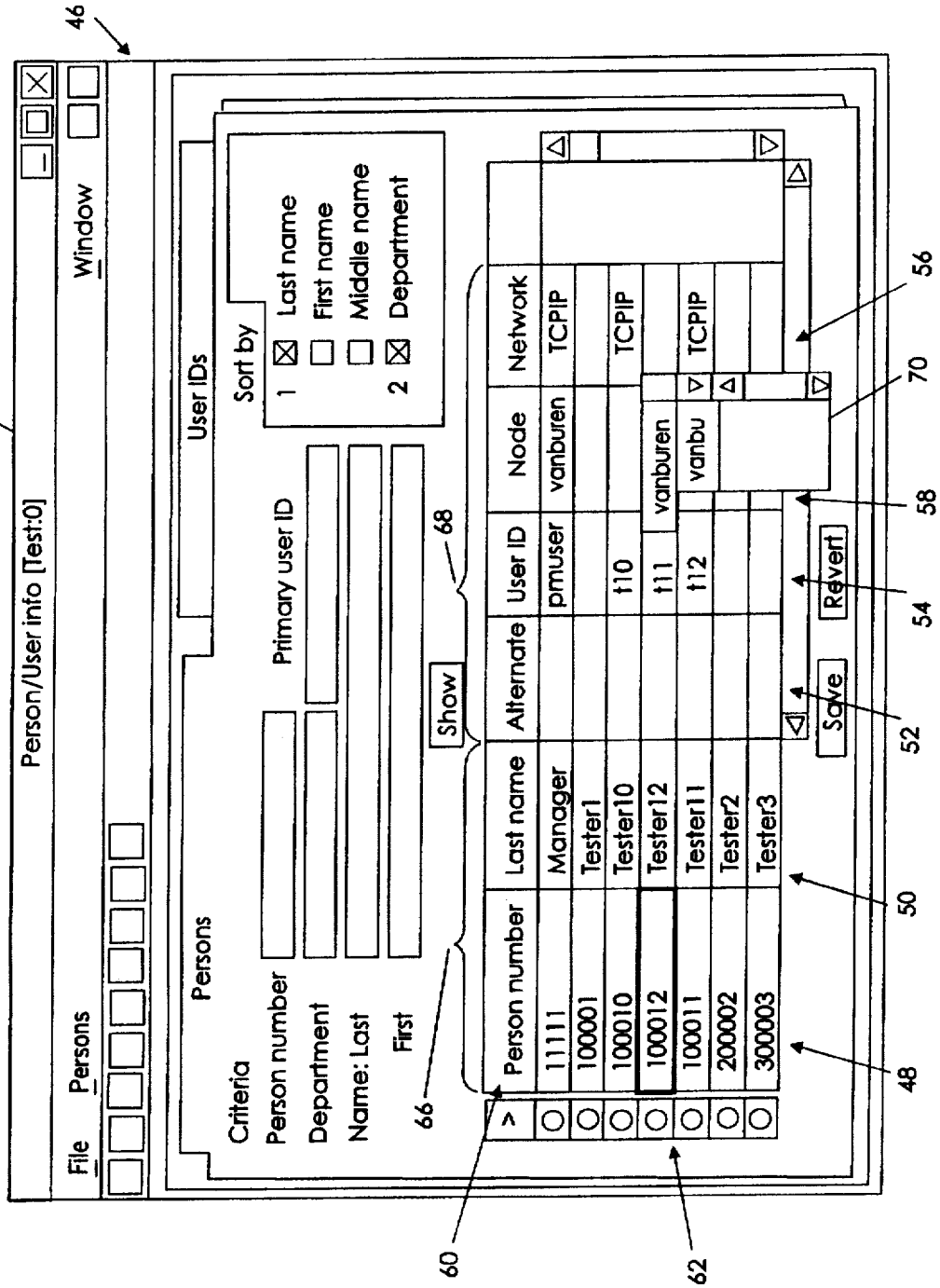
FIG. 19 is the window of FIG. 16 after an editor has been invoked for editing a cell in a column.

Furthermore, the list control 46 allows the user to associate a particular type of editor with a column. The editors that can be associated with a column include the known controls, such as entry fields, drop-down lists, and drop-down combination boxes. FIG. 19 shows the window 44 after a drop-down combination box 70 has been invoked for editing the value in a cell in column 58. Additionally, the list control 46 allows the user to make particular cells in the list control 46 read-only.

One of ordinary skill in the art will now appreciate that the present invention provides a method and system for providing improved controls in a graphical user interface. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method for efficiently specifying multiple sort criteria for a graphical user interface control, the method comprising the steps of:

displaying a list of all possible sort criteria in a sort order control;

displaying a selection indicator next to each sort criteria in the sort order control;

entering a selection of a sort criteria;

indicating the selection of the sort criteria in the selection indicator next to the sort criteria; and placing a numeric character representing the order in which the sort criteria was selected next to the sort criteria.

2. The method of claim 1, further comprising the step of:

maintaining information regarding the order in which the sort criteria are selected.

3. The method of claim 2, further comprising the step of:

after each sort criteria is selected, placing the next higher numeric character next to the sort criteria.

4. The method of claim 2, further comprising the step of:

de-selecting a sort criteria that has been selected in the sort order control.

5. The method of claim 4, wherein the step of de-selecting a sort criteria includes the steps of:

entering a selection of a sort criteria to be de-selected;

indicating the de-selection of the sort criteria in the selection indicator next to the sort criteria; and removing the numeric character next to the sort criteria.

6. The method of claim 5, wherein the step of de-selecting a sort criteria further includes the step of:

adjusting the numeric characters next to the remaining selected sort criteria.

7. The method of claim 1, wherein the selection indicator includes a check box.

8. The method of claim 7, wherein the step of indicating the selection of the sort criteria in the selection indicator includes the step of placing an "X" in the check box next to the sort criteria.

9. The method of claim 5, wherein the selection indicator includes a check box.

10. The method of claim 9, wherein the step of indicating the de-selection of the sort criteria in the selection indicator includes the step of removing an "X" in the check box next to the sort criteria.

11. A system for efficiently specifying multiple sort criteria for a graphical user interface control, the system comprising:

a central processing unit for controlling the system;

a storage connected to the central processing unit; and a graphical user interface stored in the storage for execution by the central processing unit, the graphical user interface including a sort order control for:

displaying a list of all possible sort criteria in the sort order control, displaying a selection indicator next to each sort criteria in the sort order control, entering a selection of a sort criteria, indicating the selection of the sort criteria in the selection indicator next to the sort criteria, and placing a numeric character representing the order in which the sort criteria was selected next to the sort criteria.

12. A computer program product for use in a computer system, the computer program product comprising:

a computer usable medium having computer readable program code means embodied in the medium for efficiently specifying multiple sort criteria for a graphical user interface control, the computer readable program code means including:

computer readable program code means for displaying a list of all possible sort criteria in a sort order control;

computer readable program code means for displaying a selection indicator next to each sort criteria in the sort order control;

computer readable program code means for entering a selection of a sort criteria;

computer readable program code means for indicating the selection of the sort criteria in the selection indicator next to the sort criteria; and computer readable program code means for placing a numeric character representing the order in which the sort criteria was selected next to the sort criteria.

* * * * *